United States Patent [19]

Fukuda et al.

[11] Patent Number: 6,086,497
[45] Date of Patent: *Jul. 11, 2000

[54] HYDRAULIC TENSIONER HAVING A PLUNGER WITH A SELF-CONTAINED RESERVOIR AND HIGH PRESSURE CHAMBER FOR BUFFERING

[75] Inventors: Shigekazu Fukuda; Hiroshi Hayafune; Kozo Inoue, all of Saitama-ken; Tadasu Suzuki, Tokyo, all of Japan

[73] Assignee: Tsubakimoto Chain Co., Osaka, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/742,571

[22] Filed: Oct. 28, 1996

[30] Foreign Application Priority Data

Oct. 27, 1995 [JP] Japan .................................. 7-280654

[51] Int. Cl.7 ....................................................... F16H 7/08
[52] U.S. Cl. .......................... 474/110; 474/101; 474/109; 474/111
[58] Field of Search .................................. 474/101, 109, 474/110, 111

[56] References Cited

U.S. PATENT DOCUMENTS

| | | | |
|---|---|---|---|
| 4,458,403 | 7/1984 | Foster . | |
| 4,539,001 | 9/1985 | Okabe | 474/110 X |
| 4,657,524 | 4/1987 | Okabe | 474/101 X |
| 4,963,121 | 10/1990 | Himura et al. | 474/110 |
| 4,997,411 | 3/1991 | Breon et al. | 474/110 |
| 5,073,150 | 12/1991 | Shimaya . | |
| 5,259,820 | 11/1993 | Mott . | |
| 5,304,099 | 4/1994 | Deppe et al. | 474/110 |
| 5,637,047 | 6/1997 | Schulze | 474/110 |

FOREIGN PATENT DOCUMENTS

| | | | |
|---|---|---|---|
| 509100 | 1/1955 | Canada | 474/110 |
| 1450801 | 9/1969 | Germany | 474/111 |
| 2212818 | 9/1973 | Germany | 474/111 |
| 7042804 | 4/1995 | Japan . | |

Primary Examiner—Daniel P. Stodola
Assistant Examiner—Gregory J. Strimbu
Attorney, Agent, or Firm—Dann, Dorfman, Herrell & Skillman, P.C.; Henry H. Skillman

[57] ABSTRACT

A hydraulic tensioner device, which is compact in size, simple in construction and can be manufactured efficiently, has a shoe (4) for applying a tensioning force to a chain (3) or belt. The shoe has a plunger (5) which has a hollow portion (6) in which a valve block (7), a spring (9) and an inner sleeve (10) are slidably disposed. The upper end of the inner sleeve is supported within a cylindrical chamber (2) in a tensioner body (1). The tensioner body has an oil passage (11) communicating with an internal space of the inner sleeve. The bottom surface (6A) of the hollow portion and the valve block jointly define therebetween a high pressure chamber (8) filled with an oil supplied from the internal space of the inner sleeve via a check valve (7A) in the valve block. When the plunger is forced upwardly, the oil in the high pressure chamber is discharged through a clearance (S) of a small cross-sectional area defined between the respective outside surfaces of the valve block and the inner sleeve and the inside surface of the hollow portion of the plunger. By virtue of a flow resistance created during the passage of the oil through the clearance, an impact force applied from a chain (3) to a shoe (4) is absorbed.

6 Claims, 2 Drawing Sheets

HYDRAULIC TENSIONER HAVING A PLUNGER WITH A SELF-CONTAINED RESERVOIR AND HIGH PRESSURE CHAMBER FOR BUFFERING

FIELD OF THE INVENTION

The present invention relates to a tensioner device for applying a tension to a transmission chain or a transmission belt.

BACKGROUND OF THE INVENTION

Conventional hydraulic tensioners equipped with an oil reservoir and used, for example, for the transmission of a power between a crankshaft and camshafts of an engine include, for example as shown in cross section in FIG. 2, a tensioner body 20 having a cylindrical chamber 21 in which a plunger 22 is slidably fitted, and a shoe 24 fixed to a projecting end of the plunger 22 for sliding contact with a chain 23. The plunger 22 has an internal hollow space forming, jointly with the cylindrical chamber 21, a high pressure chamber 25. A spring 26 is disposed in the hollow space of the plunger 22 and urges the plunger 22 in a direction projecting away from the tensioner body 20.

The tensioner body 20 includes a reservoir portion 27 formed integrally with and projecting laterally from the tensioner body 20. The reservoir portion 27 holds an oil supplied from an engine side and communicates via an oil passage 28 with the inlet side of a check valve 29, the outlet side of the check valve 29 communicating with the high pressure chamber 25.

The conventional hydraulic tensioner of the foregoing construction holds a chain 23 downwardly under tension as the shoe 24 normally urges the chain 23 by the force of the spring 26. When the plunger moves downwardly, the oil in the reservoir 27 flows from the oil passage 28 into the high pressure chamber 25 via the check valve 29 and fills up the high pressure chamber 25.

When an impact force is applied by the chain 23 to the shoe 24, the plunger 22 is forced into the cylindrical chamber 21, whereupon the check valve 29 is closed due to a pressure build-up in the high pressure chamber 25. Consequently, the oil in the high pressure chamber 25 is expelled to the outside of the tensioner body through a clearance between the outside surface of the plunger 22 and the inside surface of the cylindrical chamber 21 during which time the oil forcibly makes a clearance between the outside surface of the plunger 22 and an O-ring 31 fitted in an annular groove 30 formed in the inside surface of the cylindrical chamber 21. With this restricted flow of the oil, the impact force is dampened or otherwise absorbed.

Due to the oil reservoir portion 27 projecting laterally from the tensioner body 20, the aforementioned conventional tensioner device equipped with an oil reservoir is not compact and hence is unsuitable for an application as a chain tensioner device operatively interlocking engine camshafts because in this application, a large space is not available for installation of the tensioner device.

Furthermore, due to the structure employed to allow the oil to escape from the high pressure chamber 25 to the outside of the tensioner body 20 through the clearance between the outside surface of the plunger 22 and the inside surface of the cylindrical chamber 21 in order to absorb the impact force applied to the shoe 24, the O-ring 31 must be provided between the outside surface of the plunger 22 and the inside surface of the cylinder 21 to restrict, and hence offer a resistance to, the flow of the oil. The tensioner body 20 further needs a reservoir portion formed therein. Due to these structural requirements, the manufacturing cost of the conventional tensioner device is increased.

SUMMARY OF THE INVENTION

It is accordingly an object of the present invention to overcome the aforementioned problems associated with the conventional oil-reservoir-equipped hydraulic tensioner device and provide a hydraulic tensioner device which is simple in construction and can be manufactured at a low cost.

To attain the foregoing object, a hydraulic tensioner device provided according to the present invention includes a plunger having an internal bottomed hollow portion opening to an upper end, and a shoe attached to a lower end of said plunger and slidably engageable with a chain, a tensioner body having a cylindrical chamber in which said plunger is slidably fitted so that said plunger is capable of projecting downwardly from said cylindrical chamber, and an oil passage for supplying an oil to the cylindrical chamber. A valve block is slidably fitted in said hollow portion of said plunger and has a check valve. A spring is disposed in the hollow portion and acts between a bottom surface of said hollow portion and a bottom surface of said valve block. An inner sleeve is inserted into said hollow portion from said upper end thereof and has an upper end supported within said cylindrical chamber of said tensioner body and a lower end holding said valve block in a fixed position relative to said tensioner body.

The oil passage is communicated with an internal space of the inner sleeve which serves as an oil reservoir. The bottom surface of said hollow portion and said valve block jointly define therebetween a high pressure chamber which is filled with an oil supplied from said oil passage via said internal space and said check valve. When said plunger is forcibly moved upwardly from the shoe side, the oil in said high pressure chamber is discharged through a clearance between respective outside surfaces of said valve block and said inner sleeve and an inside surface of said hollow portion of said plunger.

It is preferable that said valve block and said inner sleeve are constructed as separate components structurally independent from one another, and said valve block has an upper end face held in close contact with a lower end face of said inner sleeve.

BRIEF DESCRIPTION OF THE DRAWINGS

The foregoing summary, as well as the following detailed description of the preferred embodiments of the present invention, will be better understood when read in conjunction with the appended drawings, in which.

DETAILED DESCRIPTION OF A PREFERRED EMBODIMENT

Figure 1:
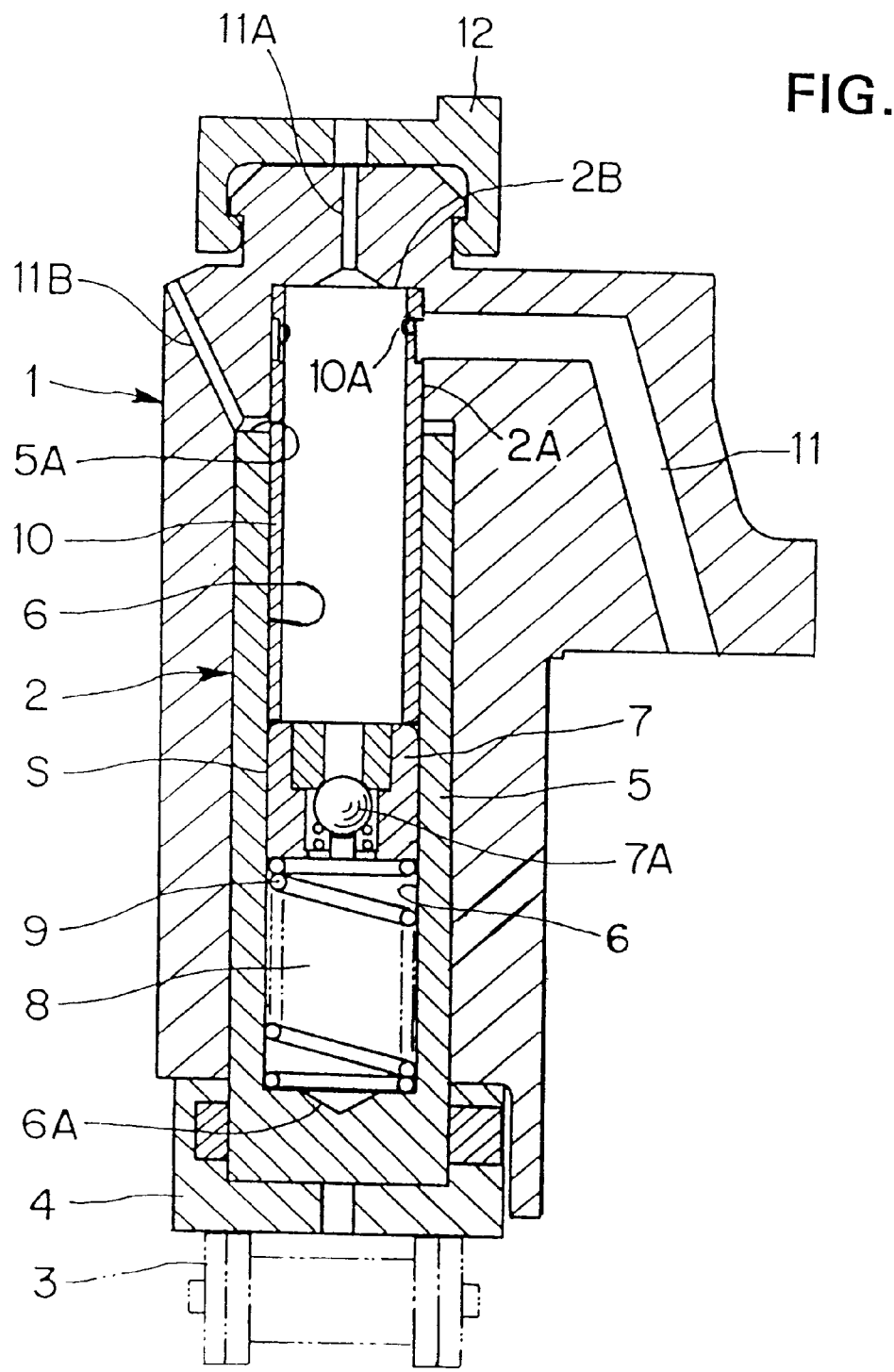
FIG. 1 is a cross-sectional view showing one embodiment of a hydraulic tensioner device according to the present invention.
Figure 2:
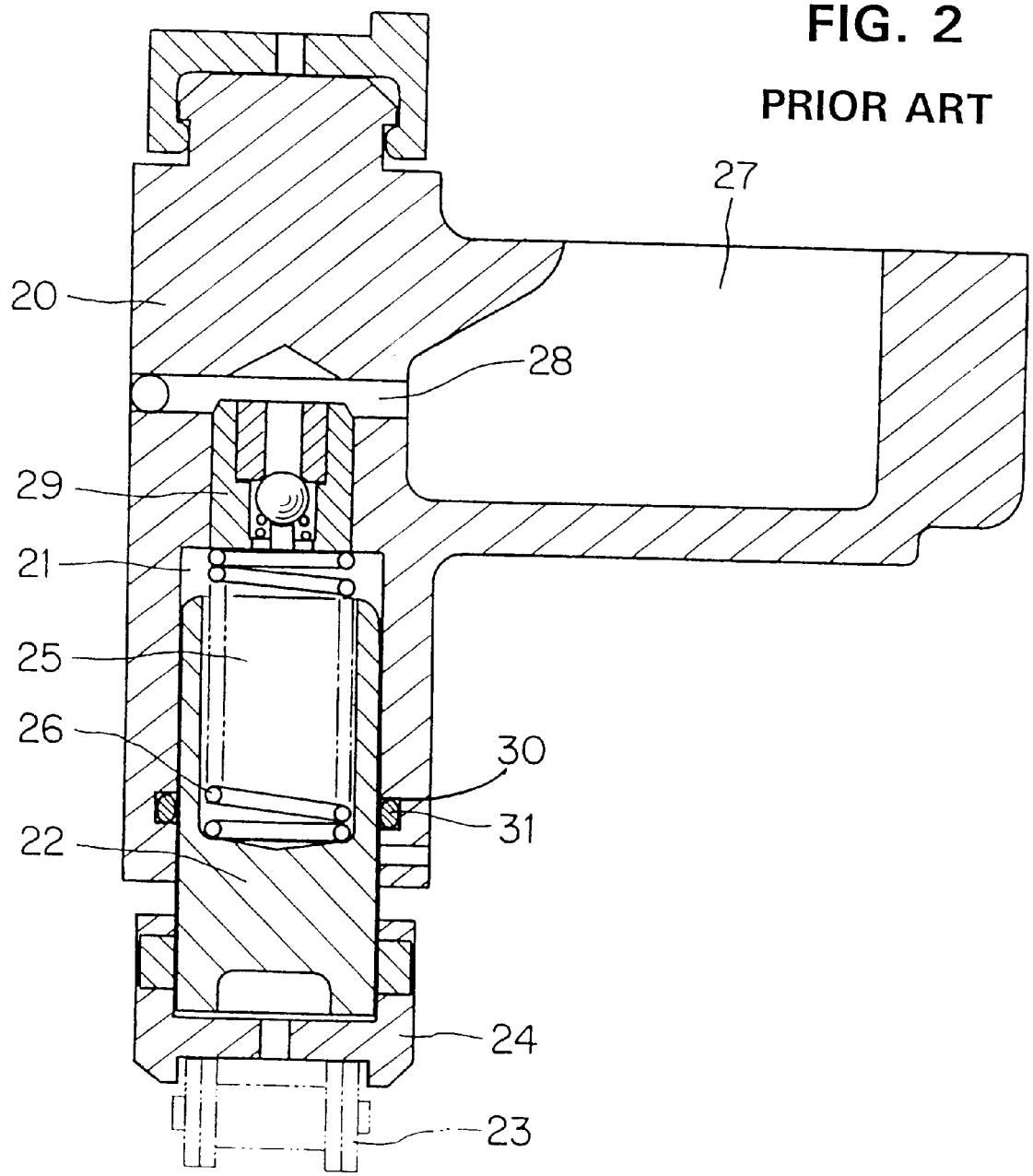
FIG. 2 is a cross-sectional view showing the structure of a conventional prior art hydraulic tensioner device.

An embodiment of the present invention will be described with reference to the embodiment of a hydraulic tensioner device shown in FIG. 1. The tensioner device includes a tensioner body 1 having a cylindrical chamber 2 formed therein. The chamber 2 has a closed upper end portion 2A which is of a diameter than the main portion of the chamber, the chamber is open at its lower end which confronts the chain 3. A plunger 5 is slidably fitted in the cylindrical chamber 2 for axial displacement therein. The plunger 5 is provided, at its lower free end, with a shoe 4 slidably engageable with the chain 3. The tensioner shoe 4 is adapted to bear transversely against a free run of a chain 3 which extends between pulleys or drive sprockets so as to maintain the proper tension on the chain. To this end, the cylindrical chamber has its axis disposed transversely to the free run of the chain 3 so that the plunger operates to apply tension to the chain. The plunger 5 has an internal hollow portion 6 closed at a lower end by a bottom surface 6A and open at the opposite upper end.

A valve block 7 is slidably received in the internal hollow portion 6 and has a check valve 7A assembled in a central portion thereof so as to allow the flow of oil only in one direction from the upper side to the lower side of the check valve 7A. The valve block 7 and a bottom surface 6A of the internal hollow portion 6 of the plunger 5 jointly define therebetween an internal space serving as a high pressure chamber 8. The high pressure chamber 8 receives therein a spring 9 which urges the bottom surface 6A of the plunger 5 in a downward direction to force the shoe 4 downwardly from the tensioner body 1 against the chain 3. The spring 9 has a lower end face held in contact with the bottom surface 6A of the hollow portion 6 and an upper end face held in contact with a lower end face of the valve block 7 so that the force of the spring 9 acts between the plunger 5 and the valve block 7. Though not shown, the plunger 5 has an anti-slip-off structure which prevents the plunger 5 from projecting from the tensioner body 1 beyond a predetermined length or extent.

The internal hollow portion 6 of the plunger 5 also slidably receives therein an inner sleeve 10. The inner sleeve 10 has a lower end face held in contact with an upper end face of the valve block 7, and an upper end portion projecting outwardly from an open end at the top of the internal hollow portion 6. The upper end of the inner sleeve 10 projects beyond the end face 5A of the portion 6, and fits into the small-diameter portion 2A of the cylindrical chamber 2 disposed near an upper end thereof, with an upper end face of the sleeve 10 held in abutment with a top wall 2B of the cylindrical chamber 2. The tensioner body 1 further has an oil passage 11 opening at its one end to an inside surface of the small-diameter portion 2A for supplying the oil from the engine side to the tensioner body 1. The inner sleeve 10 has an opening 10A located at a position directly opposed to the end of the oil passage 11 of the tensioner body 1 which provides fluid communication for introducing the oil from the oil passage 11 into the inner sleeve 10.

An air-bleeding passage 11A for removing air from the cylindrical chamber 2 has one end opening into the top wall 2B of the cylindrical chamber 2. The tensioner body 1 further has an oil discharge passage 11B opening at its one end to a portion of the cylindrical chamber 2 located close to the upper end of the inner sleeve for allowing the oil to leak to the outside of the tensioner body 1. The oil discharge passage 11B also serves as an air discharge passage.

With this arrangement, the tensioner body 1 is used in such a condition that the upper end of the tensioner body 1 attached to an attachment member 12 on the engine side. Since the spring 9 disposed in the hollow portion 6 of the plunger 5 urges, at its upper end, the valve block 7 in an upward direction, the upper end face of the valve block 7 is forced against the lower end face of the inner sleeve 10. Thus, the spring 9 is held in a fixed position relative to the tensioner body 1 via the inner sleeve 10. On the other hand, since the spring 9 urges, at its lower end, the bottom surface 6A of the hollow portion 6 in a downward direction, the free lower end of the plunger 5 projects downwardly from the tensioner body 1 so as to keep the chain 3 under tension via the shoe 4 attached to the lower end of the plunger 5. The plunger 5 is urged by the spring 9 disposed therein in such a direction that a lower portion of the plunger projects from the tensioner body 1 to exert a tension on the chain 3 via the shoe 4 attached to a lower end of the plunger and held in sliding contact with the chain.

The tensioner body 1 is supplied with an oil via the oil passage 11. The oil then flows from the opening 10A in the inner sleeve 10 into an internal space of the inner sleeve 10 which serves as an oil reservoir. A part of the oil further flows into the high pressure chamber 8 via the check valve 7A disposed in the valve block 7 providing unidirectional flow therethrough so that the high pressure chamber 8 is always filled with the oil.

When an impact force is applied from the chain 3 to the shoe 4 while the chain 3 is running, the plunger 5 is forced into the cylindrical chamber 2 whereupon the check valve 7A is closed due to a pressure rise built up in the high pressure chamber 5. When the plunger is forced into the cylindrical chamber of the tensioner body by an impact force applied from the chain side to the shoe, the oil filling up the high pressure chamber is prevented by the check valve from flowing out from the high pressure chamber. The check valve restricts flow back to the reservoir provided by the internal space of the sleeve 10. Consequently, the oil in the high pressure chamber 8 is forced to leak out from the high pressure chamber 8 to the outside of the tensioner body 1 successively through a limited clearance S between the respective outside surfaces of the valve block 7, the inside surface of the hollow portion 6 of the plunger 5 and through the restricted clearance between the outside surface of the sleeve 10 and the inside surface of the hollow portion 6, and hence through the oil discharge passage 11B and/or through a clearance between the plunger 5 and the cylindrical chamber 2. These clearances provide a path for restricted flow of oil from the high pressure chamber 8 into the oil reservoir within the sleeve 10. Owing to a flow resistance created as the oil passes through the clearance S, the impact energy acting on the shoe 4 is absorbed. A shock absorbing effect can thus be attained.

In the embodiment described above, the valve block 7 and the inner sleeve 10 are provided as separate components structurally independent from each other. However, they may be constructed as an integrally formed single component. The hydraulic tensioner device of this invention should by no means be limited to an application combined with a chain transmission system but may be used as a tensioner for a belt transmission system.

As described above, according to the present invention, the inner sleeve fitted in the plunger has an internal space used as an oil reservoir. With this arrangement, it is possible to obviate the need for an independent oil reservoir portion formed in the tensioner body as the conventional hydraulic tensioner device, thereby reducing the overall size of the tensioner device. The tensioner device can, therefore, be installed with ease even when as occurring in an application in which the tensioner device is used in combination with a timing chain synchronously driving engine camshafts, a large installation space is not available. The oil supplied from the engine side flows through the oil passage 11 formed in the tensioner body 1 into the inner sleeve 10 and is stored in the internal space of the inner sleeve serving as a reservoir. A portion the oil further flows into the high pressure chamber in the plunger via the check valve in the valve block so that the high pressure chamber is filled with the oil.

Since the tensioner body is devoid of an independent oil reservoir portion formed therein, the tensioner device is simple in construction. Furthermore, since the oil in the high pressure chamber of the plunger is expelled through a narrow space or clearance of a small cross-sectional area defined between the respective outside surfaces of the valve block and the inner sleeve and the inside surface of the hollow portion of the plunger, a large flow resistance is provided against the oil while being forced out from the high pressure chamber. With this arrangement, an O-ring provided in the conventional tensioner device between the plunger and the cylindrical chamber to provide an increased flow resistance against the oil is no longer needed, providing a reduction in manufacturing cost of the tensioner device.

The valve block and the inner sleeve are constructed as separate components, and the upper end face of the valve block is held in close or intimate contact with the lower end face of the inner sleeve by the force of the spring. This arrangement simplifies the shape of the components and facilitates easy working or processing of the components.

While a particular embodiment of the invention has been herein illustrated and described, it is not intended to limit the invention to such disclosures, but changes and modifications may be made therein and thereto within the scope of the following claims.

We claim:

1. A hydraulic tensioner device for a chain, comprising
   a hollow plunger having an upper end and a lower end, the upper end having an outer cylindrical surface, and an internal hollow portion between said upper and lower ends, said hollow portion of the plunger being bounded by an inside surface and a plunger bottom surface and being open at the upper end of said plunger;
   a shoe attached to the plunger at the lower end of said plunger and adapted to slidably engage the chain;
   a tensioner body having a cylindrical chamber in which the cylindrical upper end of said plunger is slidably engaged, said chamber having a lower end which is open and is facing the shoe so that said plunger projects downwardly from said cylindrical chamber to enable said shoe to engage the chain; said chamber having an upper end with an oil passage for supplying an oil to the cylindrical chamber;
   a valve block having a block outside surface conforming to and slidably engaged with said inside surface of said hollow portion, a block bottom surface facing the plunger bottom surface, and a check valve;
   a spring disposed in said hollow portion and bearing between said plunger bottom surface and said block bottom surface;
   an inner sleeve having a sleeve outside surface conforming to and slidably engaged with said inside surface of the hollow portion at said upper end of the hollow plunger and extending beyond the plunger into the cylindrical chamber to a stop which engages and limits movement of the sleeve relative to the tensioner body, said inner sleeve engages and limits movement of said valve block into said cylindrical chamber;
   said inner sleeve having an internal space communicating with said oil passage and serving as an oil reservoir, said block and plunger bottom surfaces defining a high pressure chamber and having a spacing therebetween to define upper and lower bounds of said high pressure chamber, said high pressure chamber adapted to be filled with the oil supplied from said oil passage through said internal space and said check valve when said plunger is displaced in a direction to enlarge the spacing between the block bottom surface and the plunger bottom surface;
   a first limited clearance between said block outside surface and said inside surface of the hollow portion and a second restricted clearance between the inside surface of the hollow portion and the inner sleeve for discharging oil in said high pressure chamber through said first and second clearances when the plunger is displaced in a direction to reduce the spacing between the block bottom surface and the plunger bottom surface, the attachment of said shoe to said plunger causing said plunger displacement to follow displacement of the shoe.

2. A hydraulic tensioner device according to claim 1, wherein said valve block and said inner sleeve are separate components structurally independent from one another,
   said valve block having an upper end face, and said inner sleeve having a lower end face, said upper and lower end faces being held in close contact by said spring.

3. A tensioner for use with a chain having a free run, comprising:
   a tensioner body with an inside cylinder wall defining a cylindrical chamber having an open end adapted to face the free run,
   a plunger slidably engaged in said chamber, and having an end projecting from the open end of the chamber and a hollow opposite end portion with an inside cylindrical plunger wall having a common axis with said inside cylinder wall of the tensioner body,
   a shoe attached to said projecting end of the plunger, adapted to engage the free run and adapted to move said projecting end of the plunger toward and away from said chamber when tension in the free run is increased and reduced, respectively,
   a valve block having an outside surface slidably engaged with said inside cylindrical plunger wall of the hollow portion for axial displacement therein, said block having a first end defining one end of an oil reservoir and a closed end of the cylindrical chamber of the tensioner body serving as an opposite end of the oil reservoir, and a second end of the valve block defining one end of a high pressure chamber in said hollow portion adjacent the projecting end of the plunger, said block and said inside cylindrical plunger wall providing therebetween a first clearence between the inside cylindrical plunger wall and the outside surface of said block for discharging a restricted flow of oil from said high pressure chamber around said valve block, said valve block having a check valve,
   means extending between said valve block and said tensioner body to fix a position of said valve block relative to said body and providing a second clearance for discharging said restricted flow of oil from said high pressure chamber around asid means, and
   a spring disposed in said hollow portion compressed between said plunger and said valve block to urge the projecting end of said plunger away from said valve block and in the direction of the chain to apply tension thereto,
   said check valve affording a unidirectional flow of oil into said high pressure chamber upon displacement of the projecting end of said plunger away from said block and restricting flow of oil out of said high pressure chamber upon return displacement of the projecting end of said plunger in a direction toward said block, said restricted flow being confined to flow permitted by said first and second clearances.

4. A tensioner according to claim 3 wherein said means to fix the position of said block relative to said body comprises a separate hollow sleeve positioned in said hollow portion, said sleeve extending between said block and the body, said sleeve engaging said block with said second clearance between said inside cylindrical plunger wall of the hollow portion and said sleeve.

5. A tensioner according to claim 4 wherein said body has an oil-supply passage, said sleeve having a hollow sleeve interior and an opening into the hollow sleeve interior providing fluid communication between said oil-supply passage and the hollow sleeve interior.

6. A tensioner according to claim 4 wherein said sleeve has an outer surface slidably mounted in the hollow portion of said plunger and an end face engaging said valve block, said second clearance and said first clearance to control the total flow out of said high-pressure chamber controlling a total flow of oil out of said high-pressure chamber plunger.

* * * * *

UNITED STATES PATENT AND TRADEMARK OFFICE
CERTIFICATE OF CORRECTION

PATENT NO.   : 6,086,497
DATED         : July 11, 2000
INVENTOR(S)  : Fukuda et al.

It is certified that error appears in the above-identified patent and that said Letters Patent is hereby corrected as shown below:

Column 3,
Line 1, after "of a" insert -- smaller --;

Column 6,
Line 60, "asid" should be -- said --;

Column 8,
Last 3 lines should read: -- said second clearance and said first clearance controlling a total flow of oil out of said high-pressure chamber upon said return displacement of said plunger --.

Signed and Sealed this

Seventh Day of August, 2001

*Attest:*

*Attesting Officer*

NICHOLAS P. GODICI
*Acting Director of the United States Patent and Trademark Office*